Patented Dec. 4, 1928.

1,693,714

UNITED STATES PATENT OFFICE.

WILLIAM HOFFMAN KOBBÉ, OF NEW YORK, N. Y., ASSIGNOR TO FLEURON, INC., OF NORTH TONAWANDA, NEW YORK, A CORPORATION OF NEW YORK.

SULPHUR-SILICA COMPOSITION.

No Drawing. Application filed November 26, 1926. Serial No. 151,024.

This invention relates to compositions containing sulphur and has for its object the provision of certain improvements in such compositions.

It has heretofore been customary to mix sulphur with various types of inert materials to form plastic or moldable compounds. Such sulphur-containing mixtures are plastic or mobile at elevated temperatures, and set to a rigid mass when cooled. Sand, graphite, coke and the like have been proposed as inert fillers for this purpose. These compositions possess certain qualities, such as inertness to chemical reaction and cheapness, which fit them for specific types of work. These compositions fail to fulfill many other requirements, and the usefulness of each compound is limited for one reason or another. Chief among the limiting reasons are the following, classified under the special type of inert material used.

The various sands, such as ordinary beach sand, silica or glass sand, molding sand, etc., are too uniform in grain size and the individual particles are so large that it is difficult to keep them in suspension in the molten mass, the heavy smooth sided grains rapidly settling to the bottom and thus causing a segregation of the sand and sulphur.

Various finely divided materials in the nature of powders, such as the different types of tripoli powders, pumice and the like, are extremely difficult to stir into the molten sulphur; having a tendency to float and not to be wetted by the sulphur. After being thoroughly wetted and mixed with melted sulphur, these materials produce compositions which have a high viscosity and as a consequence are sticky and gummy, and for this reason unsuited for pouring into orifices or small holes or openings of any type. This viscous material is also very difficult to work with the usual tools, such as trowels and the like. The tensile strength of the rigid mass which results from the setting of these mixtures is usually not above 400 pounds per square inch and generally between 300 and 400 pounds per square inch. These compositions are also very brittle, but the most pronounced defect is that of viscosity and the consequent difficulty of handling the plastic mass.

I have discovered that comminuted silica possesses certain peculiar advantages as an inert filler for admixture with sulphur. Thus, I have found that natural sands and most other inert fillers do not possess the peculiar advantageous properties of mechanically comminuted silica. With proper gradation of the particle size, I have found that comminuted silica not only remains in suspension in molten sulphur, but results in the production of a sulphur composition of increased strength and other superior properties. The invention therefore contemplates an improved sulphur composition containing comminuted silica. My present preferred practice of the invention is as follows:

A predetermined amount of sulphur by weight is melted, preferably in double boiler type of equipment, the indirect heating medium being either molten sulphur or some heavy oil. After the sulphur has entirely melted in the inner vessel a like quantity by weight of a comminuted silica is gradually stirred in. The object of the double boiler is to provide uniform melting and uniform heat transfer since sulphur compositions and sulphur itself are poor conductors of heat and are difficult to handle over a direct flame, the lower portions becoming overheated and thick, while the surface has a tendency to crust over or freeze. In addition, there is a pronounced tendency for the composition to solidify on the sides of the vessel.

Experimentation has determined that equal parts by weight of the specially comminuted silica and molten sulphur result in the best and strongest composition. Larger amounts of the comminuted silica unduly increase the viscosity of the composition, making it difficult to handle and pour, whereas a less quantity of comminuted silica has a pronounced effect on the strength of the resulting composition and will materially weaken the same. The proportions of the various particle sizes in the comminuted silica has a very great bearing on the strength and physical characteristics of the material. By screen analysis the preferred comminuted silica material falls within the following ranges:

| | Per cent. |
|---|---|
| Held on 80 mesh | from 5 to 10 |
| Passing 80 mesh, held on 100 | from 3 to 6 |
| Passing 100 mesh, held on 200 | from 20 to 30 |
| Passing 200 mesh, held on 320 | from 17 to 23 |
| Passing 320 mesh | from 38 to 46 |

It is to be understood that the above table indicates general limits. In the actual practice of the invention I have secured excellent results with a comminuted silica having the following screen analysis:

| | Per cent. |
|---|---|
| Held on 80 mesh | 7.2 |
| Passing 80 mesh, held on 100 | 5.6 |
| Passing 100 mesh, held on 200 | 25.0 |
| Passing 200 mesh, held on 320 | 19.0 |
| Passing 320 mesh | 43.2 |
| | 100.0 |

The tensile strengths of a number of compositions containing approximately 50% by weight of the foregoing comminuted silica and 50% by weight of sulphur are as follows:

| Composition No. | Tensile strength lbs. actual. |
|---|---|
| 1 | 637 |
| 2 | 626 |
| 3 | 620 |
| 4 | 575 |
| 5 | 640 |
| 6 | 624 |
| 7 | 605 |
| 8 | 700 |
| 9 | 647 |
| 10 | 570 |
| 11 | 580 |
| 12 | 643 |
| 13 | 627 |
| 14 | 632 |
| Average | 623 |

It is to be noted that this average strength is extremely high and materially in excess of anything heretofore developed in sulphur compositions.

Due to the light color of the comminuted silica, various sulphur soluble colors and pigments, such as described in my co-pending patent applications, Serial No. 61,831, filed October 10, 1925, and Serial No. 124,784, filed July 24, 1926, may be added to this improved sulphur composition thereby imparting attractive shades of color and consequently greatly enlarging its commercial usefulness and increasing its applications in the industrial arts.

The improved composition of the present invention has many commercial uses, among which may be mentioned the following: As an acid proof cement which may be used as a substitute for lead in pouring pipe joints; as a coating for tanks and other structures by mopping or flowing the molten material on the surface of the structure or preferably by applying the same by means of wire brushes or the like. The composition may also be used as a cementing material for the anchoring of bolts and studs in foundations and for many similar uses.

The material is very readily cast and may be employed for the production of various cast objects, either with or without appropriate coloring matter dyes or pigments. The new composition of the invention may also be used for the cementing of felt onto iron or the like or for other purposes which will readily occur to those familiar with the art.

I claim:

1. A new composition of matter comprising substantially equal weights of sulphur and comminuted silica, the silica being comminuted so that not more than 10% is retained on an 80 mesh screen.

2. A new composition of matter comprising sulphur and comminuted silica, the silica being comminuted so that more than 50% is finer than 200 mesh.

3. A new composition of matter comprising sulphur and comminuted silica, the silica being comminuted so that more than 50% is finer than 200 mesh and less than 10% is coarser than 80 mesh.

4. A new composition of matter comprising substantially equal weights of sulphur and comminuted silica, the silica being comminuted so that more than 50% is finer than 200 mesh.

5. A new composition of matter comprising substantially equal weights of sulphur and comminuted silica, the silica being comminuted so that more than 50% is finer than 200 mesh and less than 10% is coarser than 80 mesh.

6. A new composition of matter comprising sulphur and comminuted silica, the silica being comminuted so that its screen analysis is approximately 5% to 10% on 80 mesh, 3 to 6% on 100 mesh and through 80 mesh, 20% to 30% on 200 mesh and through 100 mesh, 17 to 23% on 320 mesh and through 200 mesh, and 38 to 46% through 320 mesh.

7. A new composition of matter comprising sulphur and comminuted silica, the silica being comminuted so that its screen analysis is approximately 7.2% held on 80 mesh, 5.6% held on 100 mesh and through 80 mesh, 25% held on 200 mesh and through 100 mesh, 19% held on 320 mesh and through 200 mesh and 43% through 320 mesh.

8. A new composition of matter comprising substantially 50% by weight of sulphur and substantially 50% by weight of comminuted silica, the silica being comminuted so that its screen analysis is approximately 5 to 10% on 80 mesh, 3 to 6% on 100 mesh and through 80 mesh, 20 to 30% on 200 mesh and through 100 mesh, 17 to 23% on 320 mesh and through 200 mesh, and 38 to 46% through 320 mesh.

9. A new composition of matter comprising substantially 50% by weight of sulphur and substantially 50% by weight of comminuted silica, the silica being comminuted so that its screen analysis is approximately 7.2% held on 80 mesh, 5.6% held on 100 mesh and through 80 mesh, 25% held on 200 mesh and through 100 mesh, 19% held on 320 mesh and through 200 mesh and 43% through 320 mesh.

In testimony whereof I affix my signature.

WILLIAM HOFFMAN KOBBÉ.